US007112759B1

(12) United States Patent
Severance, Jr.

(10) Patent No.: US 7,112,759 B1

(45) Date of Patent: Sep. 26, 2006

(54) PLASMA TORCH WITH INTERCHANGEABLE ELECTRODE SYSTEMS

(75) Inventor: Wayne Stanley Severance, Jr., Darlington, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 11/147,145

(22) Filed: Jun. 7, 2005

(51) Int. Cl.
*B23K 10/00* (2006.01)

(52) U.S. Cl. .......................... 219/121.52; 219/121.48; 219/75; 219/121.39

(58) Field of Classification Search ................ 219/119, 219/121.52, 121.48, 121.39, 121.44, 121.45, 219/75, 124.21, 137.31, 137.63, 138, 74
See application file for complete search history.

(56) References Cited

U.S. PATENT DOCUMENTS 3,604,889 A 9/1971 Rohrberg
3,649,805 A 3/1972 Rohrberg
3,739,140 A * 6/1973 Rotilio ....................... 219/144
4,048,465 A 9/1977 Manz
4,367,393 A 1/1983 Yerushalmy et al.
4,461,948 A 7/1984 Watts
4,517,437 A 5/1985 Yerushalmy et al.
4,918,280 A 4/1990 Jankus
5,097,111 A * 3/1992 Severance, Jr. ........ 219/121.52
5,258,599 A 11/1993 Moerke
6,215,090 B1 4/2001 Severance, Jr. et al.
6,346,685 B1 2/2002 Severance, Jr. et al.
6,683,279 B1 * 1/2004 Moerke ................... 219/137.2
6,706,994 B1 3/2004 Sloan
6,919,526 B1 * 7/2005 Kinerson et al. ........ 219/121.5

* cited by examiner

*Primary Examiner*—Mark Paschall
(74) *Attorney, Agent, or Firm*—Alston & Bird LLP

(57) ABSTRACT

A plasma torch is provided, comprising a first electrode holder configured to be received by the plasma torch and adapted to cut a thinner workpiece. The first electrode holder is configured to receive a first electrode assembly comprising a holder element having an emissive insert element received therein. A second electrode holder is also configured to be received by the plasma torch and is adapted to cut a thicker workpiece. The second electrode holder is interchangeable with the first electrode holder, with respect to the plasma torch. The second electrode holder is further configured to receive a second electrode assembly comprising a pencil element. The interchangeable first and second electrode holders thereby allow a single plasma torch to cut both the thinner and thicker workpieces. An associated electrode system and an electrode device are also provided.

21 Claims, 5 Drawing Sheets

PLASMA TORCH WITH INTERCHANGEABLE ELECTRODE SYSTEMS

BACKGROUND OF THE INVENTION

1. Field of the Invention

Figure 1:
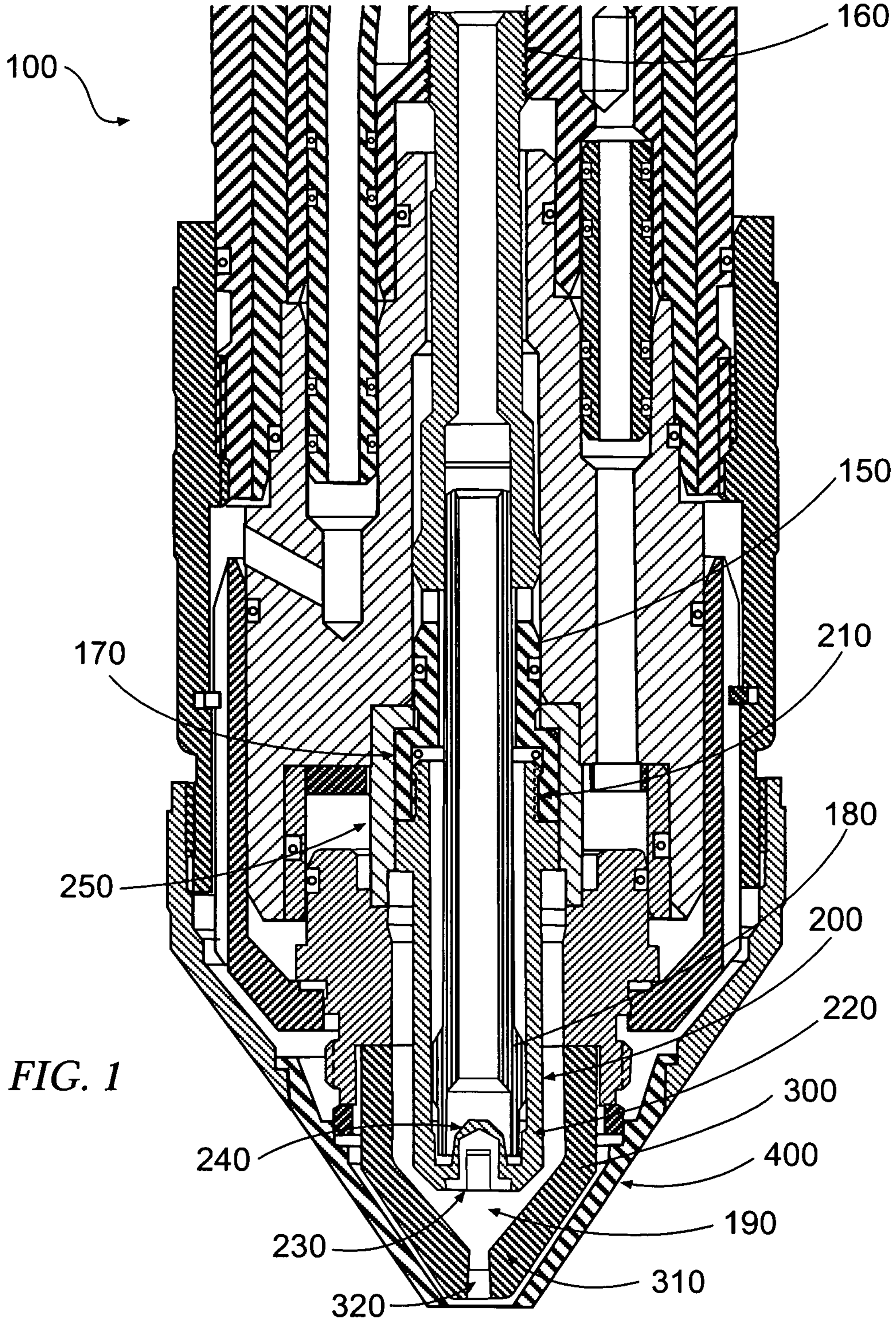

The present application is directed to plasma torches and, more particularly to a plasma torch having interchangeable electrode systems such that the same plasma torch is capable of efficiently cutting both thinner and thicker workpieces.

2. Description of Related Art

Plasma arc torches are commonly used for the working of metals, including cutting, welding, surface treating, melting, and annealing. Such torches include an electrode which supports an electric arc that extends from the electrode to a workpiece. A plasma gas is typically directed to impinge on the workpiece with the gas surrounding the arc in a swirling fashion. In some torches, a second or shielding gas, or a swirling jet of water, is used to surround the jet of plasma gas and the arc for controlling the work operation. One characteristic of existing plasma arc torches is that there is little or no efficient commonality between torches or torch configurations used to cut relatively thinner workpieces and torches or torch configurations used to cut relatively thicker workpieces. Thus, a user who desires to cut both thinner and thicker workpieces must often purchase two complete and different torch assemblies. Furthermore, a plasma arc torch manufacturer who desires to make both types of torches must manufacture and maintain inventories of two complete sets of different components, and therefore the cost complexity of the manufacturing operation are increased when both types of torches are involved. If a torch is capable of cutting both thinner and thicker workpieces, the operating conditions of such a torch for cutting a thicker workpiece may not be desirable in terms of, for example, efficiency. For instance, a Model PT-15 torch manufactured by The ESAB Group, Inc. is one example of a torch capable of cutting both thin and thick plate materials. However, cutting plates as thick as, for example, 6 inches, requires such a torch to operate at a current level of 1000 amperes, a gas flow of 400 scfh, and a voltage of up to 250 volts. Accordingly, such operational parameters make a thick plate cutting operation a relatively cost-intensive undertaking.

In a typical plasma arc torch, the plasma gas and a shielding gas or water are directed by a nozzle assembly having a plasma gas nozzle and the shielding gas or water injection nozzle coaxially arranged concentrically or in series. The nozzle assembly is electrically conductive and is insulated from the electrode so that an electrical potential difference can be established between the electrode and the nozzle assembly for starting the torch. To start the torch, one side of an electrical potential source, typically the cathode side, is connected to the electrode and the other side, typically the anode side, is connected to the nozzle assembly through a switch and a resistor. The anode side is also connected in parallel to the workpiece with no resistor interposed therebetween. A high voltage and high frequency are imposed across the electrode and nozzle assembly, causing an electric arc to be established across a gap therebetween adjacent the plasma gas nozzle discharge. This arc, commonly referred to as a pilot or starting arc, is at a high frequency and high voltage but a relatively low current to avoid damaging the torch. Plasma gas is caused to flow through the plasma gas nozzle to blow the pilot arc outward through the nozzle discharge until the arc attaches to the workpiece. The switch connecting the potential source to the nozzle assembly is then opened, and the torch is in the transferred arc mode for performing a work operation on the workpiece. The power supplied to the torch is increased in the transferred arc mode to create a cutting arc which is of a higher current than the pilot arc.

In some plasma arc torches, an emissive insert-type electrode is used for creating the arc from the electrode to a workpiece. Some such electrodes include, for example, a copper holder having a silver separator held in the copper holder. A hafnium emissive element or insert is held within the silver separator. Typically, the copper holder is held in the torch by way of external threads that mate with the internal threads of an electrode holder. Such a torch using an emissive insert-type element is generally known to be effective in cutting relatively thinner materials such as, for example, carbon steel plate up to about 1½ inches thick. In some instances, such as when cutting a thicker metal workpiece, a torch using a hafnium emissive element is usually not suitable since such a configuration is limited, for example, to a maximum current of about 400 amps. However, a torch using a tungsten insert in place of the hafnium insert in the holder can be used to cut thicker materials, though such a torch configuration using a tungsten insert electrode generally requires a minimum current of about 1000 amps in order to cut 6 inch thick material. Configuring such a torch to operate at such a high current level undesirably results in concerns regarding, for example, safety, operating efficiency, and cost of construction.

Other plasma arc torches, such as a torch using a tungsten pencil-type electrode, are generally known to be useful for cutting thick materials. Such tungsten pencil electrodes are formed of, for example, thoriated tungsten formed into a solid pencil-like shape that is held within the torch with a particular electrode holder arrangement. However, tungsten pencil-type electrodes cannot be used with air or oxygen (as the plasma gas) typically used with emissive insert-type electrodes. Instead, such tungsten pencil-type electrodes are commonly used with a mixture of 35% hydrogen and 65% argon, at up to about 600 amps for cutting thick plate materials, or with nitrogen and at currents below about 150 amps for cutting thinner plate materials. However, nitrogen and the mixture of 35% hydrogen and 65% argon are generally not the preferred gases for cutting steel less than about 1½ to 2 inches thick.

In summary, existing plasma arc torches are subject to several disadvantages such as, for example, lack of efficient commonality between torches or torch configurations used to cut relatively thinner workpieces and torches or torch configurations used to cut relatively thicker workpieces. Thus, there exists a need for a plasma torch capable of cutting both thinner and thicker plate materials in an efficient manner.

BRIEF SUMMARY OF THE INVENTION

The above and other needs are met by the present invention which, in one embodiment, provides a plasma torch comprising a first electrode holder configured to be received by the plasma torch and adapted to cut a thinner workpiece. The first electrode holder is further configured to receive a first electrode assembly comprising a holder element having an emissive insert element received therein. A second electrode holder is also configured to be received by the plasma torch and is adapted to cut a thicker workpiece. The second electrode holder is interchangeable with the first electrode holder, with respect to the plasma torch. The second electrode holder is further configured to receive a second electrode assembly comprising a pencil element. The interchangeable first and second electrode holders are thereby adapted to allow a single plasma torch to cut both the thinner and thicker workpieces.

Another aspect of the present invention comprises an electrode system for a plasma torch adapted to cut a thinner workpiece, wherein the plasma torch has a first electrode holder configured to receive a first electrode assembly comprising a holder element having an emissive insert element received therein. Such an electrode system includes a second electrode holder configured to be received by the plasma torch interchangeably with the first electrode holder. The second electrode holder is further configured to receive a second electrode assembly comprising a pencil element. The second electrode holder and the second electrode assembly are thereby adapted, when interchanged with the first electrode holder and first electrode assembly in the plasma torch, to allow the plasma torch to cut a thicker workpiece.

Yet another aspect of the present invention comprises an electrode device for a plasma torch adapted to cut a thinner workpiece, wherein the plasma torch is adapted to house a first electrode holder having a first electrode assembly including a holder element with an emissive insert element received therein. Such an electrode device comprises a second electrode holder configured to be received by the plasma torch interchangeably with the first electrode holder. The second electrode holder is further adapted, when interchanged with the first electrode holder in the plasma torch, to receive a second electrode assembly having a pencil element for allowing the plasma torch to cut a thicker workpiece.

Accordingly, embodiments of the present invention provide significant advantages as further detailed herein.

BRIEF DESCRIPTION OF THE SEVERAL VIEWS OF THE DRAWING(S)

Figure 2:
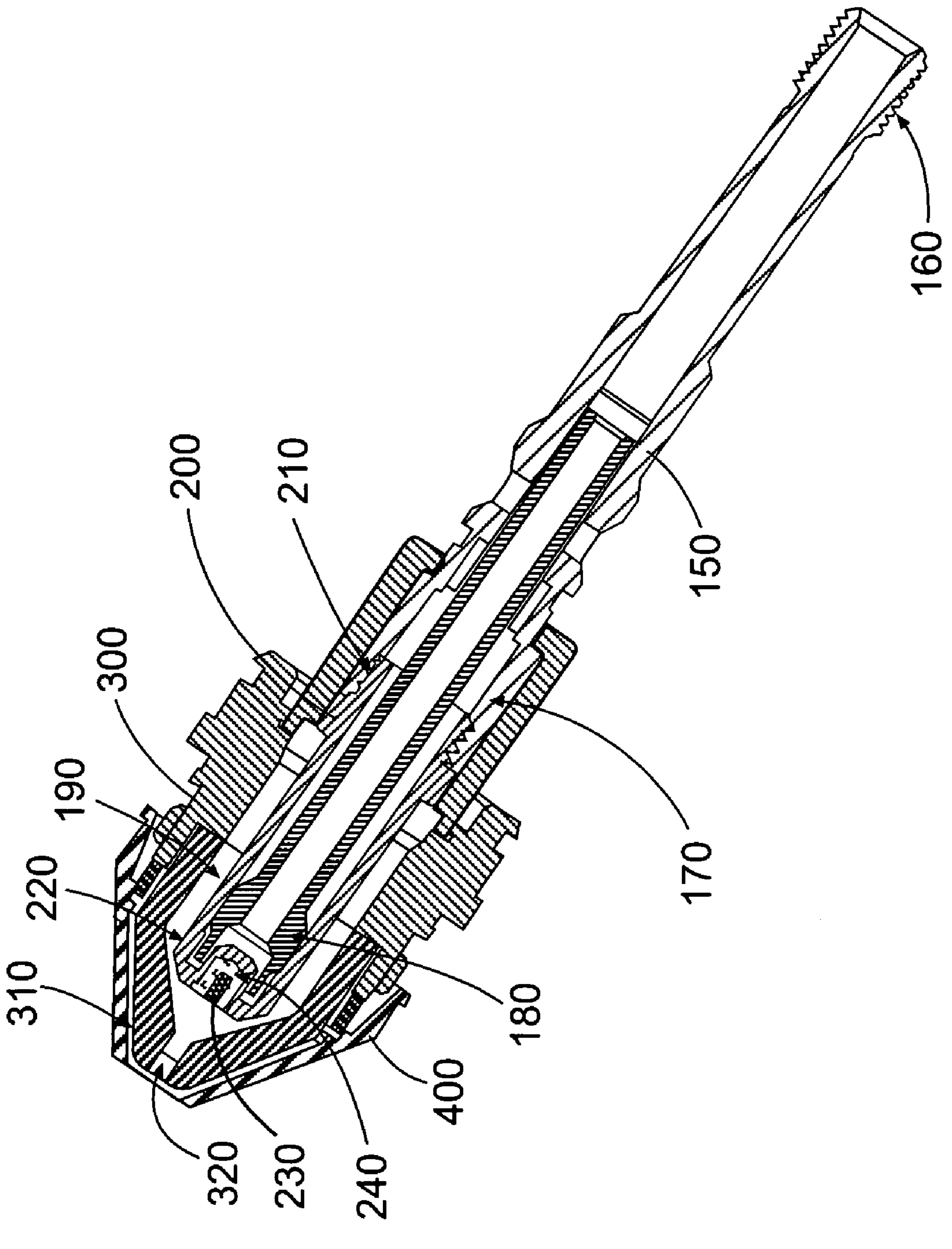
Figure 3:
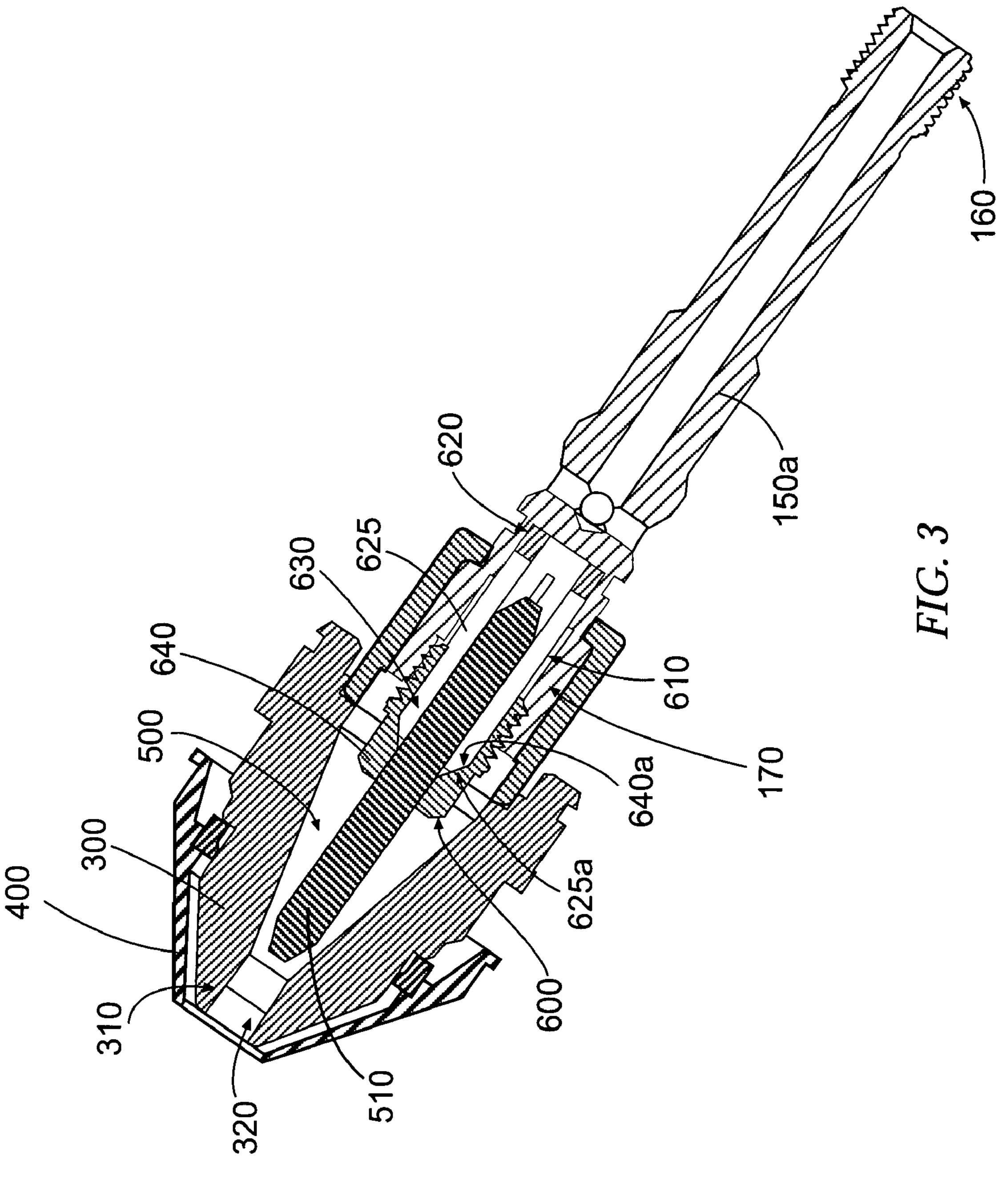
Figure 4:
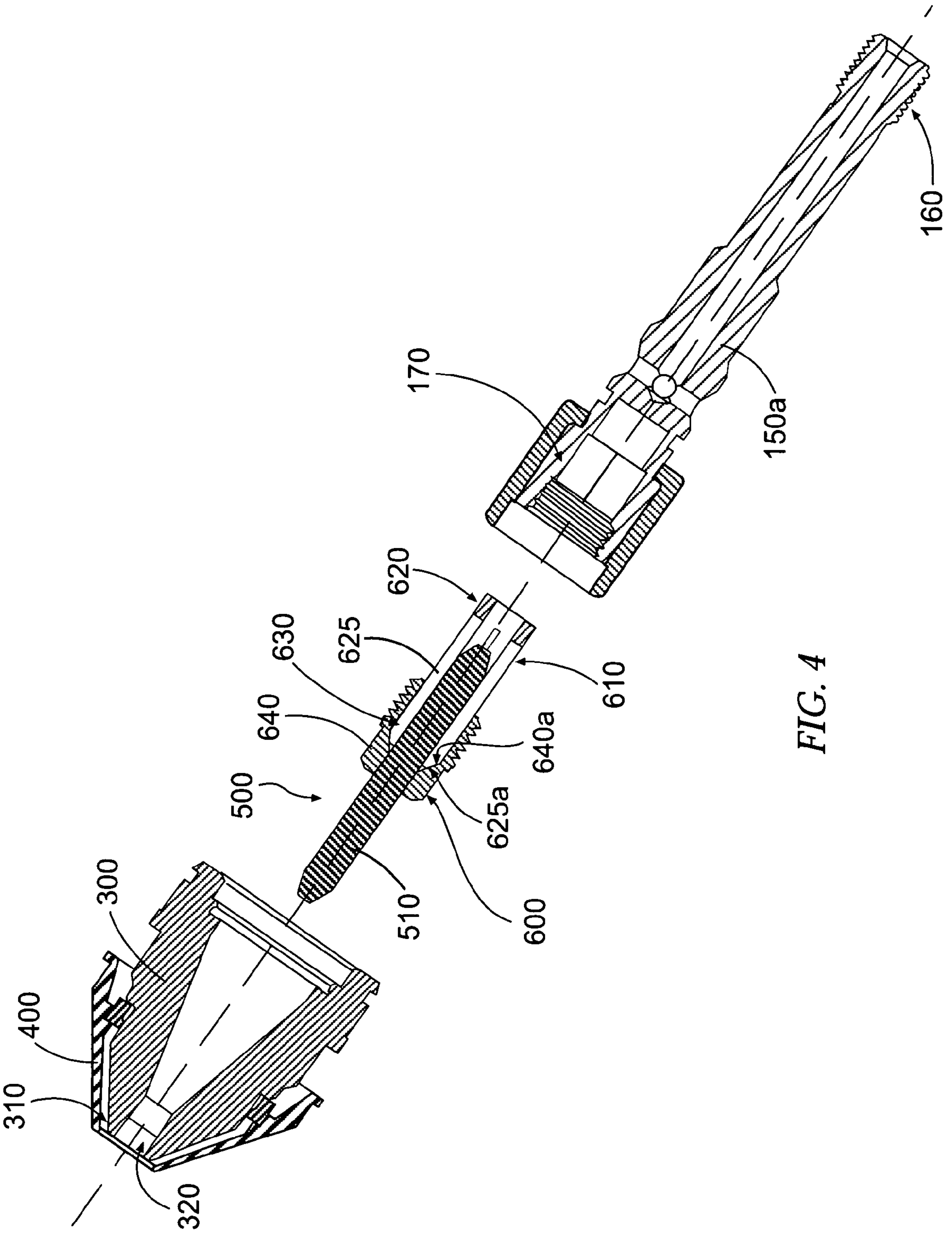
Figure 5:
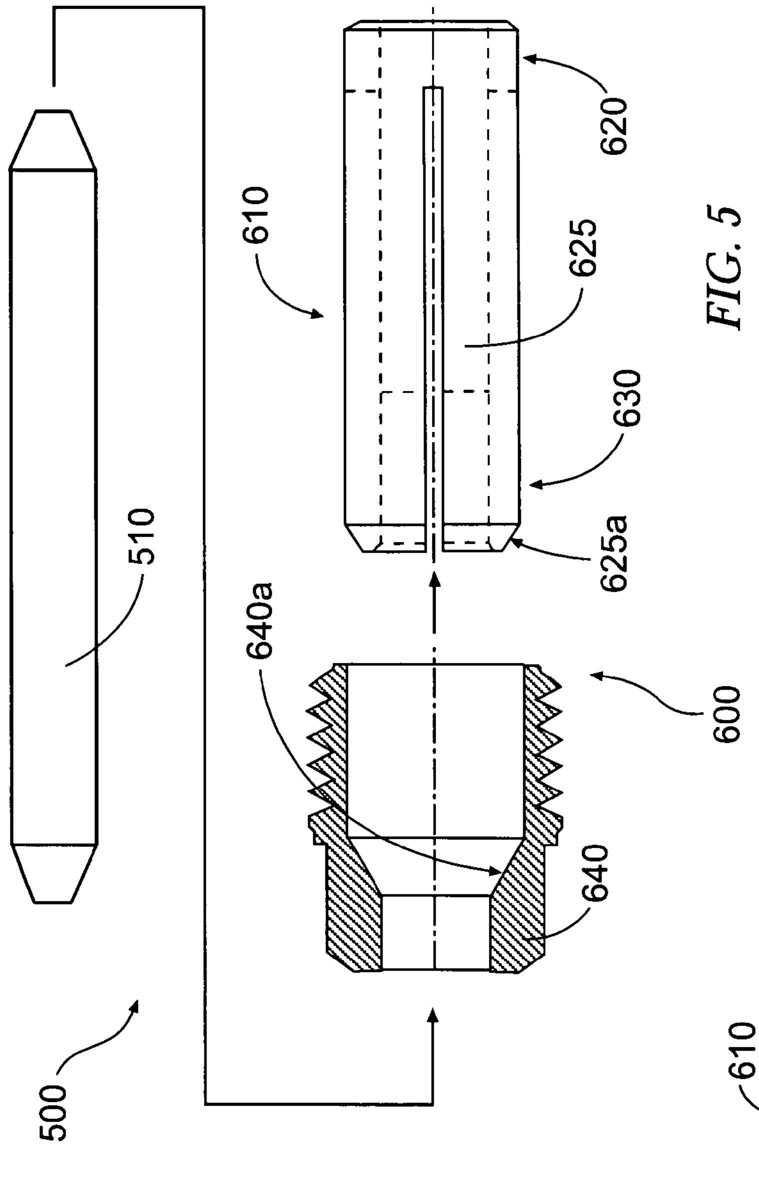
Figure 6:
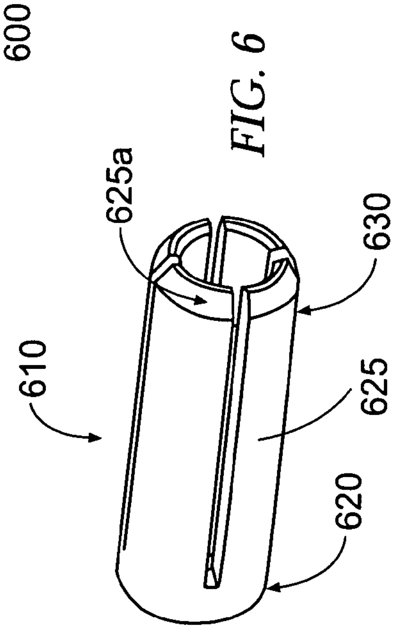

Having thus described the invention in general terms, reference will now be made to the accompanying drawings, which are not necessarily drawn to scale, and wherein:

FIG. 1 schematically illustrates a head portion of a plasma arc torch according to one embodiment of the present invention implementing an emissive insert-type first electrode assembly;

FIG. 2 schematically illustrates the emissive insert-type first electrode assembly, the associated nozzles, and the first electrode holder removed as an assembly from the torch head shown in FIG. 1, according to one embodiment of the present invention;

FIG. 3 schematically illustrates a pencil-type second electrode assembly, the associated nozzles, and the second electrode holder, as an assembly, that can be interchanged with assembly comprising the emissive insert-type first electrode assembly, the associated nozzles, and the first electrode holder, as shown in FIG. 2, in the torch head shown in FIG. 1, according to one embodiment of the present invention FIG. 4 is an exploded view of the pencil-type second electrode assembly, the associated nozzles, and the second electrode holder shown in FIG. 3, according to one embodiment of the present invention;

FIG. 5 is a further exploded view of the pencil-type second electrode assembly shown in FIG. 4, according to one embodiment of the present invention; and FIG. 6 is a perspective view of the collet shown in FIG. 5, according to one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates one embodiment of a plasma torch according to the present invention implementing an emissive insert-type electrode, the plasma torch being generally indicated by the numeral 100. A plasma torch of the type disclosed herein will be appreciated by one skilled in the art such that an extensive description of such a torch is not necessary. However, examples of such torches can be found, for instance, in U.S. Pat. Nos. 6,346,685 and 6,215,090, both to Severance, Jr. et al. and assigned to The ESAB Group, Inc., also the assignee of the present invention, though such examples are not intended to be limiting in any manner with respect to the present invention.

The plasma torch 100 shown in FIG. 1 includes a first electrode holder 150 configured to be received in the head portion of the torch 100. The first electrode holder 150 is generally tubular and includes opposed axial ends 160, 170. The tubular first electrode holder 150 is configured to channel a coolant, such as a liquid or a gas, therethrough from the proximal end 160 toward the distal end 170 and into an electrode cooling tube 180 received within the electrode holder 150. In some instances, the cooling tube 180 may be permanently installed in the first electrode holder 150, for example, with an adhesive or through silver brazing. A first electrode assembly 190 includes an extended holder element 200 that is also generally tubular, includes opposing ends 210, 220, and is configured so as to be capable of extending over the electrode cooling tube 180 such that the proximal end 210 engages, such as through a threaded connection, the distal end 170 of the first electrode holder 150. The distal end 220 of the holder element 200 is configured to define an axially-centered recess for receiving an emissive insert element 230, wherein the emissive insert element 230 may be comprised of, for example, hafnium. In some advantageous instances, the emissive insert element 230 is separated from the holder element 200 by a separator element 240, wherein the holder element 200 is comprised of, for instance, copper, while the separator element 240 is comprised of, for example, silver.

With such an emissive insert-type electrode, the torch 100 uses a current level, for example, up to about 400 amps with the plasma gas comprising, for instance, air, oxygen, nitrogen, or combinations thereof. In this regard, a tubular gas swirl baffle 250, comprised of, for example, ceramic or plastic, is configured to extend around the first electrode holder 150/first electrode assembly 190 about the interface therebetween, and defines a plurality of tangentially-extending swirl holes (not shown) about the circumference thereof for facilitating swirling of the plasma gas about the first electrode assembly 190. The torch 100 further implements a nozzle 300 configured to engage the gas swirl baffle 250 and extend over the first electrode assembly 190 comprising the holder element 200/separator element 240/emissive insert element 230. The nozzle 300 engaged with the gas swirl baffle 250 is configured to receive the plasma gas therein through the swirl holes so as to direct the plasma gas about the first electrode assembly 190 and toward the tip 310 of the nozzle 300, wherein the plasma gas then exits the nozzle 300 through the nozzle exit orifice 320 onto the workpiece. The torch 100 may also include a shielding nozzle 400 extending over the nozzle 300 for directing the shielding fluid to surround the plasma gas jet. The configuration thus shown in FIG. 1 includes the first electrode holder 150/first electrode assembly 190 in a first cutting arrangement, and is typically suited for cutting relatively thinner workpieces.

According to advantageous aspects of the present invention, a plasma arc torch 100 as shown in FIG. 1 can also be readily configured to cut relatively thicker workpieces. More particularly, as shown in FIG. 2, the torch 100 can readily be disassembled so as to remove the first electrode assembly 190 and the first electrode holder 150 therefrom. That is, when the nozzle 300 and shielding nozzle 400 are removed from the torch 100, the holder element 200 can be unscrewed or disengaged from the distal end 170 of the first electrode holder 150, before the first electrode holder 150 is removed from the torch 100. In the alternative, the first electrode assembly 190 and the first electrode holder 150 can be removed from the torch 100 as a single assembly. As shown in FIGS. 3 and 4, the emissive insert-type electrode assembly 190 and first electrode holder 150 can then be replaced with a pencil-type second electrode assembly 500 and suitable second electrode holder 150*a*. For example, the second electrode holder 150*a* configured to receive the pencil-type second electrode assembly 500 typically does not require an electrode cooling tube 180 as found in the first electrode holder 150. The torch 100 including the second electrode assembly 500/second electrode holder 150*a* thereby represents a second cutting arrangement whereby the torch 100 is adapted to cut relatively thick materials.

The pencil-type electrode assembly 500 implements an electrode element 510 formed in a pencil- or rod-like shape, wherein the electrode element 510 may be comprised of, for example, tungsten or, more particularly, thoriated, ceriated, or lanthanated tungsten. A tungsten electrode element 510, however, generally cannot be used with air or oxygen for the plasma gas (which is typically used with emissive element-type electrodes), but must instead be used with a plasma gas comprising, for example, argon and hydrogen, such as a mixture of about 35% hydrogen and about 65% argon. The tungsten pencil-type electrode element 510 has been found to be capable of cutting thick plate materials using a current level on the order of about 600 amps. Accordingly, in changing between the emissive insert-type first electrode assembly 190/first electrode holder 150 and the pencil-type second electrode assembly 500/second electrode holder 150*a*, the torch 100 must also be configured to allow both the plasma gas source and the current level to be appropriately adjusted commensurately with the electrode assembly/electrode holder being inserted into the torch 100. The selection of the plasma gas and/or the current level may be manually performed by an operator or, in some instances, the torch 100 may be configured to automatically sense the type of electrode and/or configuration of the electrode holder installed therein and then appropriately adjust the plasma gas and/or the current level.

As shown in FIG. 5, the pencil-type second electrode assembly 500 includes a collet assembly 600 for receiving the electrode element 510 and securing the same in the second electrode holder 150*a*. The collet assembly 600 comprises, for instance, a collet 610 (shown in perspective in FIG. 6) having opposed ends 620, 630 and defining an axially-extending bore. More particularly, the collet 610 includes a tubular portion about the proximal end 620 and a contiguous split continuation portion defining a plurality of extension elements 625 extending axially from the tubular portion to the distal end 630. The collet 610 is configured to receive the rod-like electrode element 510 in the axially-extending bore such that the electrode element 510 extends through the distal end 630 and is surrounded by the extension elements 625. A collet body 640 defining a bore is configured to extend over the distal end 630 of the collet 610 such that the extension elements 625 are received in the collet body 640 and the electrode element 510 extends through the bore defined by the collet body 640.

The pencil-type second electrode assembly 500, comprising the electrode element 510, the collet 610, and the collet body 640, is then configured to be engaged with the second electrode holder 150*a* so as to allow the torch 100 to be reassembled. More particularly, the proximal end 620 of the collet 610 is configured to be inserted into the second electrode holder 150*a* such that the collet body 640 can threadedly engage the second electrode holder 150*a* (in the same manner as the holder element 200 of the emissive insert-type first electrode assembly 190 engaging the first electrode holder 150). In some instances, the second electrode holder 150*a* may be configured such that the collet 610 is limited in the axial extent of the insertion thereof into the second electrode holder 150*a*. The collet body 640 and the extension elements 625 at the distal end 630 of the collet 610 further define complementarily-configured tapered surfaces 625*a*, 640*a*. As such, when the collet body 640 is threadedly engaged with the second electrode holder 150*a*, the axial movement of the collet body 640 being threaded onto the second electrode holder 150*a*, combined with the restricted axial movement of the collet 610 caused by the second electrode holder 150*a*, causes the interaction of the complementarily-configured tapered surfaces 625*a*, 640*a* to urge the extension elements 625 at the distal end 630 of the collet 610 radially inward toward the electrode element 510. The radial compression of the extension elements 625 thus axially secures the electrode element 510 with respect to the collet 610/collet body 640. One skilled in the art will appreciate, however, that such reassembly of the second electrode assembly 500/second electrode holder 150*a* may be performed either before or after the second electrode holder 150*a* is engaged with the torch 100.

The nozzle 300, as well as the shielding nozzle 400 (either or both of which may be the same as, or different in configuration from, the nozzle 300/shielding nozzle 400 used with the emissive insert-type first electrode assembly 190, as necessary for providing appropriate operating conditions for the torch 100), can then be re-installed to complete reassembly of the torch 100. It follows that the plasma gas and the current level would then be appropriately changed for the tungsten pencil-type second electrode assembly 500 now installed in the torch 100.

One skilled in the art will appreciate, however, that the process of securing the electrode element 510 within the collet 610/collet body 640 may also involve axial adjustment of the electrode element 510, possibly in an iterative process, such that an optimum spacing between the electrode element 510 and the interior of the tip 310 of the nozzle 300, about the nozzle exit orifice 320, is attained. The capability of the electrode element 510 to extend further toward the nozzle exit orifice 320 (as shown in FIG. 4), as compared to the holder element 200/separator element 240/emissive insert element 230 of the emissive insert-type first electrode assembly 190 (as shown in FIG. 1), has been identified by the inventor as one factor allowing such a torch 100 as described herein, implementing a pencil-type second electrode assembly 500/second electrode holder 150*a* to efficiently cut thicker materials at relatively lower current levels, on the order of about 600 amps.

Thus, embodiments of the present invention allow a single plasma arc torch to be appropriately configured to use an emissive insert-type first electrode assembly with corresponding first electrode holder to cut relatively thinner materials and a pencil-type second electrode assembly with corresponding second electrode holder to cut relatively thicker materials. Since the necessary modification(s) for allowing this single torch to cut both thinner and thicker materials generally involves a change in electrode assembly and electrode holder, advantages are realized in, for example, allowing a user who desires to cut both thinner and thicker workpieces to purchase a single torch assembly having the two different electrode assemblies with two respectively-appropriate electrode holders. Further advantages are realized where the plasma arc torch manufacturer does not have to manufacture and maintain inventories of two complete sets of different components (save for the electrode assemblies and electrode holders) for thin material and thick material cutting torches. As a result, a more cost-efficient inventory system, as well as a simpler and less extensive manufacturing operation, are attained. In addition, the capability of using a lower current level for cutting thicker materials, as in the case of the pencil-type second electrode assembly, desirably results in more efficient operating conditions, and may also allow the torch to use less complex and less robust systems than would ordinarily be required for cutting thick materials.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An electrode system for a plasma cutting torch, comprising:

a first electrode holder configured to be received by the plasma cutting torch in a first cutting arrangement, the first electrode holder being further configured to receive a first electrode assembly comprising a holder element having an emissive insert element received therein such that the plasma cutting torch is adapted to cut a thinner workpiece; and a second electrode holder configured to be received by the plasma cutting torch in a second cutting arrangement, the second electrode holder being interchangeable with the first electrode holder with respect to the plasma cutting torch, the second electrode holder being further configured to receive a second electrode assembly comprising a pencil element such that the plasma cutting torch is adapted to cut a thicker workpiece, the interchangeable first and second electrode holders thereby being configured such that a single plasma cutting torch is adapted to cut both the thinner and thicker workpieces.

2. An electrode system according to claim 1 wherein the first electrode assembly further comprises a separator element configured to separate the emissive insert element from the holder element.

3. An electrode system according to claim 1 wherein the holder element is comprised of copper and the emissive insert element is comprised of hafnium.

4. An electrode system according to claim 2 wherein the separator element is comprised of silver.

5. An electrode system according to claim 1 wherein the holder element is configured to threadedly engage the first electrode holder.

6. An electrode system according to claim 1 wherein the pencil element is comprised of a material selected from the group consisting of thoriated tungsten, ceriated tungsten, and lanthanated tungsten.

7. An electrode system according to claim 1 wherein the second electrode assembly further comprises a collet assembly disposed between and configured to secure the pencil element to the second electrode holder, the collet assembly including a collet having opposed first and second ends and defining an axial bore, the collet further including a tubular portion extending from the first end and a contiguous split continuation portion defining a plurality of extension elements and extending axially from the tubular portion to the second end, the collet being configured to receive the pencil element through the bore such that the pencil element extends through the second end and is surrounded by the extension elements.

8. An electrode system according to claim 7 wherein the collet assembly further comprises a collet body defining a bore and configured to extend over the second end and the extension elements of the split continuation portion such that the pencil element extends through the bore, the collet body and the split continuation portion defining complementarily configured tapered surfaces such that axial engagement of the collet body and the split continuation portion urges the extension elements radially inward toward the pencil element so as to axially secure the pencil element with respect to the collet assembly.

9. An electrode system according to claim 8 wherein the second electrode holder is configured to receive and limit axial movement of the collet with respect thereto, and wherein the collet body is configured to threadedly engage the second electrode holder so as to secure the collet therein and to cause the extension elements to act upon and secure the pencil element.

10. An electrode system according to claim 1 wherein the first and second electrode holders are configured to be interchangeably disposed in a torch head of the plasma cutting torch, and the plasma cutting torch further comprises a gas supply configured to be capable of selectively supplying a first gas for use with the first electrode holder and a second gas for use with the second electrode holder to the torch head for interaction with the corresponding one of the first and second electrode holders received by the plasma cutting torch.

11. An electrode system according to claim 10 wherein the first gas is selected from the group consisting of air, oxygen, nitrogen, and combinations thereof.

12. An electrode system according to claim 10 wherein the second gas is selected from the group consisting of hydrogen, argon, and combinations thereof.

13. An electrode system according to claim 1 wherein the plasma cutting torch further comprises a current source configured to be capable of selectively supplying a first current level to the first electrode assembly and a second current level to the second electrode assembly for the corresponding one of the first and second electrode holders received by the plasma cutting torch.

14. An electrode system according to claim 13 wherein the first current level is up to about 400 amps.

15. An electrode system according to claim 13 wherein the second current level is up to about 600 amps.

16. An electrode system for a plasma cutting torch, the plasma cutting torch having a first electrode holder received therein in a first cutting arrangement, the first electrode holder being configured to receive a first electrode assembly comprising a holder element having an emissive insert element received therein such that the plasma cutting torch is adapted to cut a thinner workpiece, the electrode system comprising:

a second electrode holder configured to be received by the plasma cutting torch in a second cutting arrangement, interchangeably with the first electrode holder, the second electrode holder being further configured to receive a second electrode assembly comprising a pencil element, the second electrode holder and the second electrode assembly thereby being configured such that, when interchanged with the first electrode holder and first electrode assembly in the plasma cutting torch, the plasma cutting torch is adapted to cut a thicker workpiece.

17. An electrode system according to claim 16 wherein the pencil element is comprised of a material selected from the group consisting of thoriated tungsten, ceriated tungsten, and lanthanated tungsten.

18. An electrode system according to claim 16 wherein the second electrode assembly further comprises a collet assembly disposed between and configured to secure the pencil element to the second electrode holder, the collet assembly including a collet having opposed first and second ends and defining an axial bore, the collet further including a tubular portion extending from the first end and a contiguous split continuation portion defining a plurality of extension elements and extending axially from the tubular portion to the second end, the collet being configured to receive the pencil element through the bore such that the pencil element extends through the second end and is surrounded by the extension elements.

19. An electrode system according to claim 18 wherein the collet assembly further comprises a collet body defining a bore and configured to extend over the second end and the extension elements of the split continuation portion such that the pencil element extends through the bore, the collet body and the split continuation portion defining complementarily configured tapered surfaces such that axial engagement of the collet body and the split continuation portion urges the extension elements radially inward toward the pencil element so as to axially secure the pencil element with respect to the collet assembly.

20. An electrode system according to claim 19 wherein the second electrode holder is configured to receive and limit axial movement of the collet with respect thereto, and wherein the collet body is configured to threadedly engage the second electrode holder so as to secure the collet therein and to cause the extension elements to act upon and secure the pencil element.

21. An electrode device for a plasma cutting torch, the plasma cutting torch being adapted to house a first electrode holder in a first cutting arrangement, the first electrode holder including a first electrode assembly having a holder element with an emissive insert element received therein such that the plasma cutting torch is adapted to cut a thinner workpiece, the electrode device comprising:

a second electrode holder configured to be received by the plasma cutting torch in a second cutting arrangement, interchangeably with the first electrode holder, the second electrode holder being further adapted, when interchanged with the first electrode holder in the plasma cutting torch, to receive a second electrode assembly having a pencil element such that the plasma cutting torch is adapted to cut a thicker workpiece.

* * * * *